United States Patent [19]
Holmes et al.

[11] Patent Number: 6,052,630
[45] Date of Patent: Apr. 18, 2000

[54] THRUSTER OPTIMIZED PAIR SELECTION

[75] Inventors: Thomas J. Holmes, Portola Valley; Christopher R. Purvis, Menlo Park, both of Calif.

[73] Assignee: Space Systems/Loral, Inc., Palo Alto, Calif.

[21] Appl. No.: 08/768,214

[22] Filed: Dec. 17, 1996

[51] Int. Cl.[7] .................... B64G 1/24; B64G 1/26
[52] U.S. Cl. ............... 701/13; 244/164; 244/169; 244/171
[58] Field of Search ............. 701/13; 244/164, 244/169, 171

[56] References Cited

U.S. PATENT DOCUMENTS

| | | | |
|---|---|---|---|
| 4,961,551 | 10/1990 | Rosen ........................... | 244/164 |
| 5,130,931 | 7/1992 | Paluszek et al. ............ | 701/226 |
| 5,140,525 | 8/1992 | Shankar et al. ............. | 701/226 |
| 5,310,143 | 5/1994 | Yocum et al. ............... | 244/164 |
| 5,335,179 | 8/1994 | Boka et al. .................. | 701/13 |
| 5,610,820 | 3/1997 | Shankar et al. ............. | 701/13 |
| 5,806,804 | 9/1998 | Goodzeit et al. ........... | 244/169 |
| 5,850,993 | 12/1998 | Hubert ......................... | 244/169 |
| 5,884,869 | 3/1999 | Fowell et al. ............... | 244/169 |

*Primary Examiner*—William A. Cuchlinski, Jr.
*Assistant Examiner*—Olga Hernandez
*Attorney, Agent, or Firm*—Perman & Green, LLP

[57] ABSTRACT

A method for controlling the direction of a spacecraft of the type having a controller for calculating thrust forces comprises a plurality of thrusters disposed on said spacecraft in a spaced relationship relative to one another and aligning and locating each of said plurality of thrusters at a predetermined angle on said spacecraft relative to first, second and third orthogonally oriented axes such that the firing of any given pair of thrusters produces a torque about one of said spacecraft axes; and firing of all of said plurality of said thrusters in equal amounts at one time to cause the spacecraft to move in a linear manner along one of said three orthognally disposed axes.

27 Claims, 3 Drawing Sheets

THRUSTER OPTIMIZED PAIR SELECTION

FIELD OF THE INVENTION

The present invention relates to a three-axis attitude control system for a satellite, and deals more particularly with an improvement in such controls whereby a satellite may effect torque control using only paired thrusters and without the heretofore known requirement of matrix inversions to effect such control.

BACKGROUND OF THE INVENTION

Spacecraft perform various maneuvers after they are launched into space and once they are on-station in a selected orbit. For example, after a spacecraft is launched into a low orbit, it may be required to raise the spacecraft to a selected higher (e.g., Geosynchronous) orbit by firing the spacecraft's main thruster. This type of maneuver is known as an orbit-raising maneuver. Also by example, after the spacecraft is on-station in the higher orbit, various forces (e.g., solar forces) may impinge on the spacecraft and cause the spacecraft to drift away from its selected orbit into another incorrect orbit. Thus, periodic (e.g., monthly) orbital maneuvers are often required to return the spacecraft to its correct orbit. These types of maneuvers are known as station-keeping maneuvers.

During each of the maneuvers, the controlling of the spacecraft's attitude to orient the spacecraft's communication hardware to a preselected planetary location and/or to correctly orient the spacecraft's thrust vector is essential. Thus, spacecraft are typically equipped with control systems which enable the attitude of the spacecraft to be controlled within pre-established limits. Such control systems often employ spacecraft thrusters for producing torques on the spacecraft, if needed, for correcting the spacecraft attitude. By example, during orbit-raising maneuvers, attitude control can be maintained by activating selected ones of the spacecraft's thrusters to create a desired torque in order to correct the spacecraft's attitude. Since the spacecraft's thrusters are normally-off during these maneuvers, and are only activated when needed, these thrusters function in an "on-modulation mode" and may be referred to as "on-modulated thrusters". Also by example, during station-keeping maneuvers, where selected ones of the spacecraft's thrusters are normally-on for performing station-keeping functions, these thrusters can be used to achieve attitude control in order to create a desired torque on the spacecraft which will correct the spacecraft's attitude.

There are several spacecraft systems used for controlling station-keeping and attitude including, by example, one system which may be understood in view of the block diagram of a spacecraft thruster control system shown in FIG. 1. Sensors 1, which may be, for example, earth sensors, sense the spacecraft dynamics, such as the attitude of the spacecraft during a maneuver, and provide the sensed information to a controller block 3 via a hardware (H/W) and software (S/W) interface 2. The controller block 3 determines whether there is error between the sensed attitude and a desired or reference attitude and, if there is such an error, calculates torques necessary to be produced by selected thrusters 6 to minimize the error. A duty cycle for the thrusters is then calculated based upon the calculated torques and an amount of torque known to be produced by the selected thrusters when the thrusters are activated. A thruster hardware control block 5 provided and is responsive to receiving a pulse from a modulator block connected to the controller for controlling an appropriate thruster corresponding to the pulse. Once the thruster is commanded to activate, valves of the thruster emit a stored fuel and a stored oxidizer which combust upon contacting one another to generate a force of a known magnitude.

In the past the control system for controlling the coordinated On and OFF conditions of one or more thrusters to effect such movements of the spacecraft in space required the manipulation of large matrixes including the multiplication thereof, even in spacecraft wherein only four thrusters are used. These types of spacecraft are usually the less-expensive spacecraft. One prior art patent which illustrates such known control systems which are usable with such spacecraft is set forth in U.S. Pat. No. 5,140,525. This system is driven by established methods in constrained optimization theory which involve among other things, weighted pseudo inversions of torque matrixes, etc., requiring the use of a highly memory intensive flight computer on board the spacecraft.

Reference may be had to other patents which involve similar satellite controls as follows:

| | |
|---|---|
| 3,866,025 | Cavanagh |
| 4,537,375 | Chan |
| 4,599,697 | Chan et al. |
| 4,758,957 | Hubert et al. |
| 4,961,551 | Rosen |

Accordingly it is an object of the present invention to provide a satellite control system which does not use either pseudo-inverses nor matrix inversions nor any matrix operations.

It is a further object of the invention to provide a satellite control system and thruster arrangement aligned optimally prior to spacecraft fabrication so as to guarantee positive ON-times for all four thrusters, independent of the sign and/or magnitude of the desired torques.

It is a further object of the invention to provide a control system which effects satellite control of the aforementioned type accomplished through non-linear computer coded logic that is easy to implement.

SUMMARY OF THE INVENTION

The invention resides in a method of controlling the direction of a spacecraft by providing a plurality of thrusters disposed on the spacecraft in a spaced relationship relative to one another and aligning and locating each of the plurality of thrusters at a predetermine angle on the spacecraft relative to first, second and third orthogonally oriented axes such that the firing of any given pair of thrusters produces a torque about one of the spacecraft axes.

DETAILED DESCRIPTION OF THE PREFERRED EMBODIMENT

Figure 1:
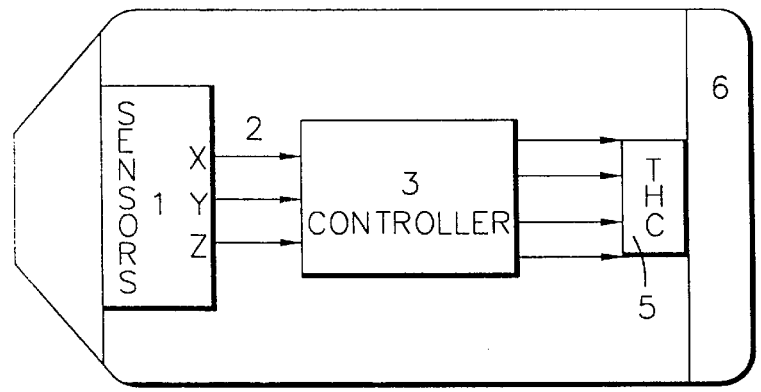
FIG. 1 is a schematic drawing of a spacecraft capable employing the system of the present invention.
Figure 2:
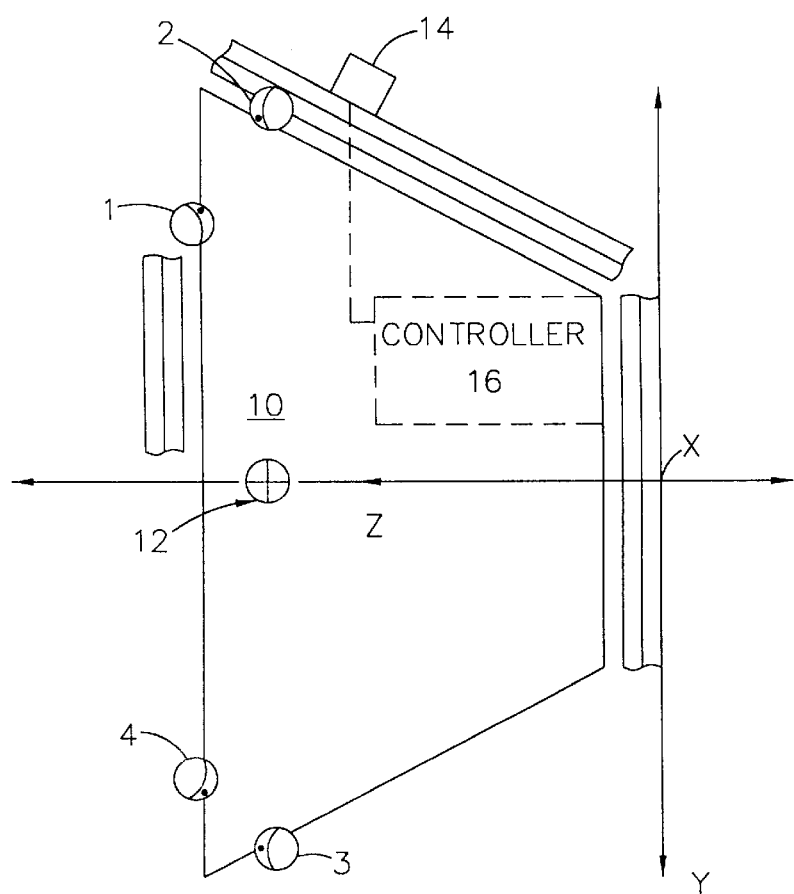
FIG. 2 a rear view of the spacecraft showing the thruster array embodying the invention.

Referring now to FIG. 2, it should be seen that the numeral 10 generally identifies a spacecraft 10. The spacecraft 10 has a center of gravity which is identified as 12 in FIG. 1. Attitude sensors for sensing movements about the indicated X, Y, and Z axes are provided and are shown together as block 14. Signals are generated from the sensor block 14 and are coupled to a controller 16 for generating thruster controls. A plurality of thrusters referenced as 1, 2, 3, and 4 are provided and are arranged on the spacecraft in accordance with one aspect of the invention. Each of the thrusters is controllably connected to the controller 16 to effect control of the ON and OFF conditions of each thruster.

For purposes of discussion, the spacecraft 10 is shown relative to three coordinate axes which have been referenced as X, Y, and Z, and will also be referenced in describing the associated three axis control torques. Also, for purposes of illustration and discussion of spacecraft orientation relative to the earth below, the indicated positive Y direction is south, the indicated negative Y direction is north, while the indicated positive Z direction is east and the indicated negative Z direction is west, and the X axis direction into the page is positive and is directed toward the earth while the negative X axis is directed away from the earth. The center of gravity 12 of the spacecraft 10 is disposed coincidentally with the Z axis and the thruster configuration of the present invention is disposed about the mass center 12 such that thrusters 1 and 2 are located above the Z axis and thrusters 3 and 4 are located below the Z axis.

Once the spacecraft 10 is on-station in its designated orbit, various forces (e.g., solar radiation) may impinge on the spacecraft and cause it to drift away from its selected orbit into another, incorrect, orbit. Thus, periodic (e.g., monthly) station-keeping maneuvers are often required to return the satellite to its correct orbit. During station-keeping maneuvers, it is necessary to fire selected pairs of the thrusters 1, 2, 3, and 4 to effect such correction.

To these ends, the spacecraft thrusters are aligned and located at the fabrication stage so that any given pair of thrusters produces a torque about a spacecraft axis (X,Y,Z) of either zero or (plus/minus) twice the torque of a single thruster. Six possible thruster pairs give six pure torques (one positive, one negative) about each of the spacecraft's three axes as can be seen from Table 2.

The thruster array is thus a constrained, nonlinear parameter optimization that as part of the spacecraft design selects the locations and orientations (i.e., angles) of the thruster nozzles to effect controlled torques about each of the X, Y and Z axes.

The thrusters are primarily used in pairs to produce spacecraft control torques. This is done, for example, in a four thruster array, by selecting the locations and angles of each thruster so that, any pair of six possible pairs of thrusters (e.g., thruster 1 and 2 together, or 1 and 4, or 2 and 3, etc.) products a positive (or negative) torque solely along one of the three spacecraft axes (X,Y,Z). Producing pure torques along a different set of spacecraft axes (x', y', z') requires only a simple coordinate transformation inside the optimization algorithm. Either way, the resulting six possible pair combinations span the torque space of the spacecraft using only four thrusters.

The optimization of the thruster array on the spacecraft 10 is such that it aligns each thruster so that the torque produced along each spacecraft axis is equal (or equal and opposite) to the corresponding torques of the other three thrusters when generated by a selected pair of the thrusters 1–4. That is, $Tx=|Tx_1|=|Tx_2|=|Tx_3|=|Tx_4|$, and so forth for Ty and Tx. It is this result that enables a pair of thrusters, fired together, to produce positive or negative torques purely along one of the three spacecraft axes.

In addition, the thruster configuration of FIG. 2 is a departure from configuration heretofore known in that if all the thrusters are activated in unison, it will result in pure linear motion along the indicated X axis. The firing of all thrusters to effect such linear movement may have particular usefulness during orbit-raising maneuvers where a newly launched satellite is raised from a lower orbit to a selected, higher (e.g., Geosynchronous) orbit.

Table 1 below shows an example set of thruster torques (T) expressed in Newton-meters (Nm) generated by each thruster 1, 2, 3 and 4 for the design configuration of the invention shown in FIG. 2.

Figure 3A:
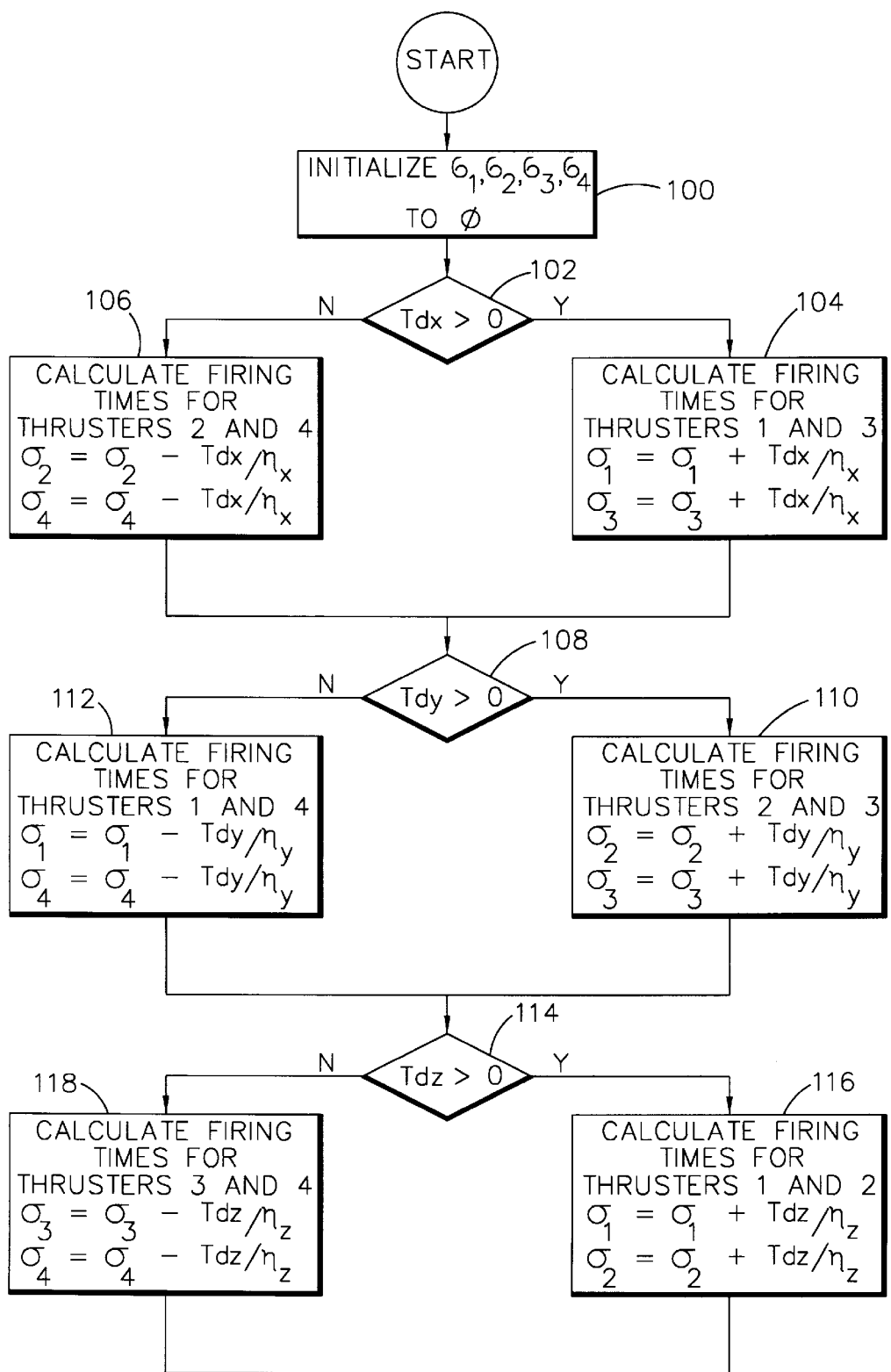
FIGS. 3*a* and 3*b* are flowcharts of the thruster control program.
Figure 3B:
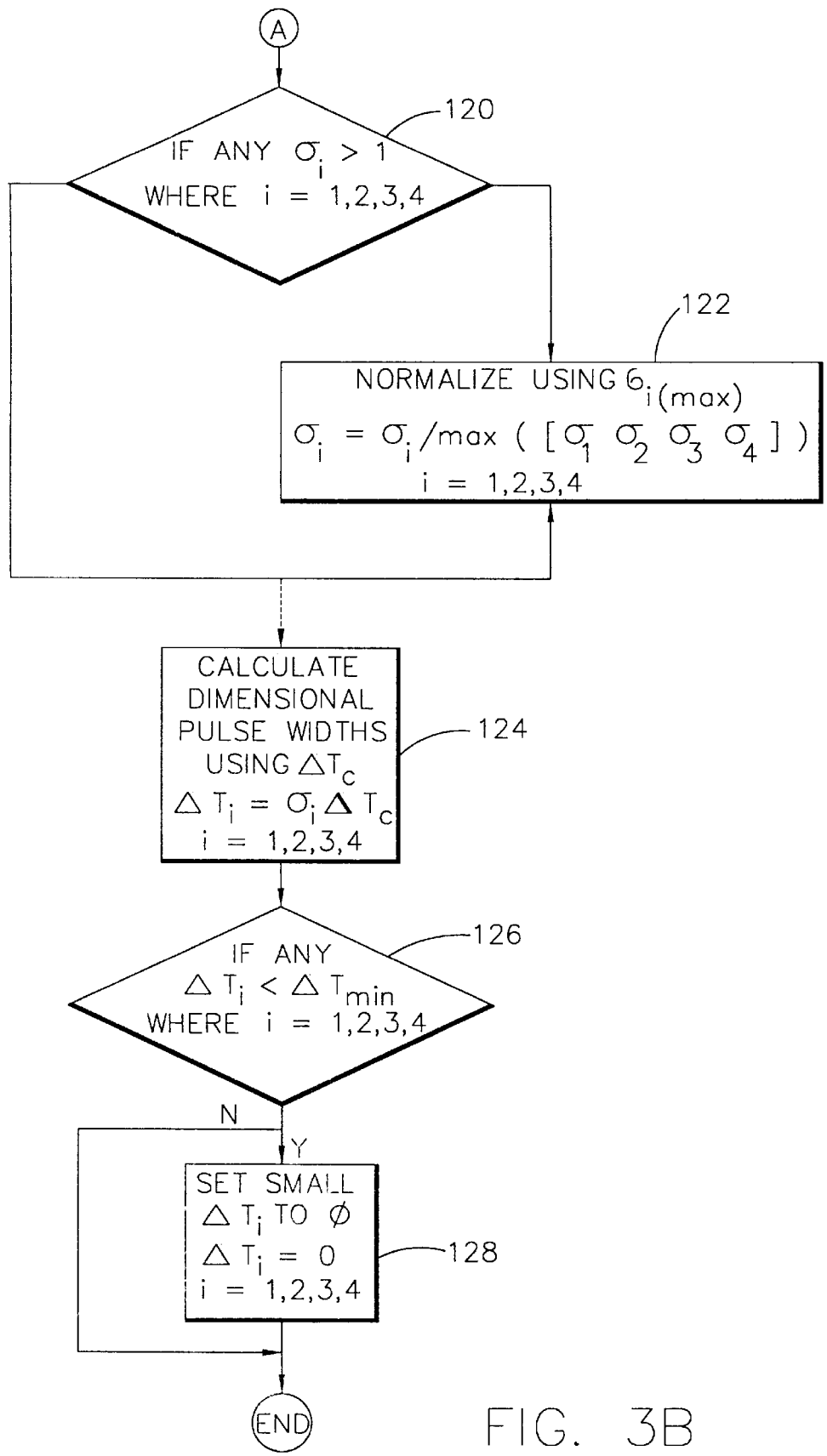

For purposes of this discussion, each of the thrusters in the embodiment of FIG. 2 are labeled 1, 2, 3 and 4 which are correspondingly labeled to the thruster number referred to in the Tables 1 and 2 and the flow charts of FIGS. 3a and 3b.

TABLE 1

EXAMPLE THRUSTER TORQUES

| Thruster No. | Tx Nm | Ty Nm | Tz Nm |
|---|---|---|---|
| 1 | 0.175 | −0.250 | 0.500 |
| 2 | −0.175 | 0.250 | 0.500 |
| 3 | 0.175 | 0.250 | −0.500 |
| 4 | −0.175 | −0.250 | −0.500 |

Taking each of the thruster torques Tx, Ty, and Tz produced respectively by thrusters 1, 2, 3, and 4 as set forth above and pairing them in all possible combinations, a result is achieved which includes the torque products set forth below in Table 2. The value $\eta$ is the torque that any two thrusters produces, either zero torque or ± twice the thrust values for Tx, Ty, or Tz.

TABLE 2

THRUSTER FIRING PAIRS

| No. of Firing Pair | Ctrl Torque Direction/ Axis | Thruster Pair Torques $\eta$, (Nm) | Thrusters Composing this Firing Pair (1 = on, 0 = off) | | | |
|---|---|---|---|---|---|---|
| | | | 1 | 2 | 3 | 4 |
| 1 | +x | +(2 * Tx) = 0.35 | 1 | 0 | 1 | 0 |
| 2 | −x | −(2 * Tx) = −0.35 | 0 | 1 | 0 | 1 |
| 3 | +y | +(2 * Ty) = 0.50 | 0 | 1 | 1 | 0 |
| 4 | −y | −(2 * Ty) = 0.50 | 1 | 0 | 0 | 1 |
| 5 | +z | +(2 * Tz) = 1.00 | 1 | 1 | 0 | 0 |
| 6 | −z | −(2 * Tz) = 1.00 | 0 | 0 | 1 | 1 |

For example, consider briefly that the spacecraft controller determines that over a next processor or duty cycle $\Delta T_c$, (e.g., 64 ms) of controller 16 that the following control torques $T_d$ are required:

$(T_{dx}, T_{dy}, T_{dz})=(0.4, -0.2, 0.5)$ Nm.

Using the individual thruster torques of Table 1 for this example, a value $\eta$ for each paired thruster torque is determined:

$(\eta_x, \eta_y, \eta_z)=(2*0.175, 2*0.250, 2*0.500)=(0.35, 0.50, 1.00)$ Nm.; for $\Delta T_c=64$ ms Following the algorithm outlined in FIGS. 3a and 3b (steps 102–118) which will be discussed in greater detail later, nondimensional firing times $\sigma$ are calculated.

$(\sigma_1, \sigma_2, \sigma_3, \sigma_4)=(2.24, 0.50, 1.114, 0.60)$

These values are then scaled to available thrust (steps 120, 122) which results in:

($\sigma_1$, $\sigma_2$, $\sigma_3$, $\sigma_4$)=(1.00, 0.22, 0.51, 0.27)

Then, the dimensional pulsewidths are calculated for each of four thrusters in milliseconds as set forth in step 124:

($\Delta T_1$, $\Delta T_2$, $\Delta T_3$, $\Delta T_4$)=(64.00, 14.27, 32.61, 17.12) ms Typically, pulsewidths having minimum thresholds are eliminated. For example, if the minimum pulsewidth is 32 ms, with a quantization of 2 ms beyond this minimum, then from steps 126 and 128:

($\Delta T_1$, $\Delta T_2$, $\Delta T_3$, $\Delta T_4$)$_{actual}$=(64, 0, 32, 0)ms.

Normally, these pulsewidths would be sent to the control system to provide the controller with values for the actual thrusts and torques produced by the thrust producing algorithm.

Referring now more specifically to the control program illustrated in FIGS. 3a and 3b, it should be seen that the sensor block 16 senses the attitude of the spacecraft and provides information representing the sensed attitude to the controller. The controller block 3 then determines whether there is a difference between the sensed attitude and a desired or reference attitude and, if there such an difference, calculates torques necessary to be produced by at least one of the thruster sets to minimize the difference. The calculated torques Tx, Ty and Tz are then divided by the known and predetermined torque $\eta_x$, $\eta_y$, $\eta_z$ that is characteristic of each thruster pair when fired as part of a duty cycle.

Referring now to the flowchart blocks of FIGS. 3a and 3b, a four thruster system is disclosed. The program at the start of the duty cycle, first intializes the values of $\sigma_1$, $\sigma_2$, $\sigma_3$, $\sigma_4$ to 0 (step 100) which otherwise represent fractions of the duty cycle $\Delta T_c$. The controller next determines a value for the required torque about the X axis, $Td_x$, by interrogating the sensor block 14. Once a $Td_x$ value is established, the program next determines the rotational sense i.e. positive or negative of the torque to be applied.

A determination is thus made as to whether the $Td_x$ value is a positive or negative number (step 102). If the value of $Td_x$ is greater than 0, the program executes the functions set forth in step 104. That is, for generating a positive torque Tx about the X axis, thrusters 1 and 3 are used and dimensionless thruster firing times $\sigma_1$, $\sigma_3$ must be calculated for and assigned to each thruster based upon the required force.

The calculation for the $\sigma_1$ value for thruster 1 is done by dividing the established $Td_x$ value by the corresponding thruster pair torque ($\eta_x$) which, as shown in the data set forth in TABLE 2, corresponds to the thruster pair torque for [PAIR 1]. In a like manner, the value of $\sigma_3$ for thruster 3 is also calculated by dividing the established $Td_x$ by the same corresponding thruster pair torque ($\eta_x$) because thrusters 1 and 3 are paired to generate positive X axis torque.

If it is determined at step 102 that the established value for the $Td_x$ is a negative number, e.g. meaning that a negative torque is needed, the control program executes the functions set forth at step 106. That is, for generating a negative torque Tx about the X axis, thrusters 2 and 4 are used and dimensionless thruster firing times $\sigma_2$, $\sigma_4$ must be calculated and assigned to each thruster based upon the required force needed. The calculation for the $\sigma_2$ value for thruster 2 is done by dividing the established $-Td_x$ value by the corresponding thruster pair torque ($\eta_x$) which as shown in the data set forth in TABLE 2 corresponds to the thruster pair torque for [PAIR 2]. In a like manner, the value of $\sigma_4$ for thruster 4 is also calculated by dividing the established $-Td_x$ by the same corresponding thruster pair torque ($\eta_x$) because thrusters 2 and 4 are paired to generate a negative X axis torque.

The control program sequentially next establishes a $Td_y$ value by interrogating the sensor block 14 and then determining whether the applied torque is to be positive or negative (Step 108). If $Td_y$ is a positive number then the functions in step 110 are executed. That is, for generating a positive torque Ty about the Y axis, thrusters 2 and 3 are used and dimensionless thruster firing times $\sigma_2$, $\sigma_3$ must be calculated and assigned to each thruster based upon the required force needed.

The calculation for the $\sigma_2$ value for thruster 2 is done by dividing the established $Td_y$ value by the corresponding thruster pair torque ($\eta_y$) for the involved thruster pair and, as set forth in TABLE 2, this corresponds to the thruster pair torque for [PAIR 3]. In a like manner, the value of $\sigma_3$ for thruster 3 is also calculated by dividing the established $Td_y$ by the same corresponding thruster pair torque ($\eta_y$) because thrusters 2 and 3 are paired to generate positive Y axis torque.

If it is determined at step 108 that the established value for the $Td_y$ is a negative number, e.g. meaning that a negative torque is needed, the control program executes the functions set forth at step 112. That is, for generating a negative torque $-Ty$ about the Y axis, thrusters 1 and 4 are used and dimensionless thruster firing times $\sigma_1$, $\sigma_4$ must be calculated and assigned to each thruster based upon the required force needed.

The calculation for the $\sigma_1$ value for thruster 1 is done by dividing the established $-Td_y$ value by the corresponding thruster pair torque ($\eta_y$) which, as shown in the data set forth in TABLE 2, corresponds to the thruster pair torque for [PAIR 4]. In a like manner, the value of $\sigma_4$ for thruster 4 is also calculated by dividing the established $-Td_y$ by the same corresponding thruster pair torque ($\eta_y$) because thrusters 2 and 4 are paired to generate a negative Y axis torque.

The control program again sequentially next establishes a $Td_z$ by interrogating the sensor block 14 and then determining whether the applied torque is to be positive or negative (Step 114). If $Td_z$ is a positive number, then the functions in step 116 are executed. That is, for generating a positive torque Tz about the Z axis, thrusters 1 and 2 are used and dimensionless thruster firing times $\sigma_1$, $\sigma_2$ must be calculated and assigned to each thruster based upon the required force needed.

The calculation for the $\sigma_1$ value for thruster 1 is done by dividing the established $Td_z$ value by the corresponding thruster pair torque ($\eta_z$) for the involved thruster pair, and as set forth, in TABLE 2, this value corresponds to the thruster pair torque for [PAIR 5]. In a like manner, the value of $\sigma_2$ for thruster 2 is also calculated by dividing the established $Td_z$ by the same corresponding thruster pair torque ($\eta_z$) because thrusters 1 and 2 are paired to generate positive Z axis torque.

If it is determined at step 114 that the established value for the $Td_z$ is a negative number, e.g. meaning that a negative torque is needed, the control program executes the functions set forth at step 118. That is, for generating a negative torque $-Tz$ about the Z axis, thrusters 3 and 4 are used and dimensionless thruster firing times $\sigma_3$, $\sigma_4$ must be calculated and assigned to each thruster based upon the required force needed.

The calculation for the $\sigma_3$ value for thruster 3 is done by dividing the established $-Td_z$ value by the corresponding thruster pair torque ($\eta_z$) which as shown in the data set forth in TABLE 2 corresponds to the thruster pair torque for [PAIR 6]. In a like manner, the value of $\sigma_4$ for thruster 4 is also calculated by dividing the established $-Td_z$ by the same corresponding thruster pair torque ($\eta_z$) because thrusters 3 and 4 are paired to generate a negative Z axis torque.

It should be understood that throughout the foregoing calculations, from step 100 to step 118, the values of the firing times $\sigma_1$, $\sigma_2$, $\sigma_3$, $\sigma_4$ are continuously summed such that by the end of the sequence up to either of steps 116 or 118, a firing time for each of the thrusters 1, 2, 3, 4 is determined which takes into account corrections needed relative to each axis, X, Y, and Z, for the given duty cycle $\Delta T_c$.

Following this, the control program checks each of the calculated values $\sigma_1$, $\sigma_2$, $\sigma_3$, $\sigma_4$ to determine if any value is greater than unity (step 120). If so, then using the largest magnitude value which exceeds unity, the remaining values are scaled or normalized relative to it (step 122).

Next the control program calculates dimensional pulsewidths for each of the four thrusters based upon a given processor duty cycle time $\Delta T_c$, which in the illustrated example is equal to 64 ms. This is done by multiplying each of the values $\sigma_1$, $\sigma_2$, $\sigma_3$, $\sigma_4$ by the duty cycle time $\Delta T_c$ to produce the product pulsewidth for each thruster.

Finally, a check is made to determine whether any of the pulsewidths calculated for each thruster is below a minimal threshold pulsewidth $\Delta T_{min}$ (step 126). If a pulsewidth $T_1$, $T_2$, $T_3$, $T_4$ is below this threshold, then it is set to zero. Following this, the calculated pulse width values $T_1$, $T_2$, $T_3$, $T_4$ are used by the controller 16 in the thrust producing algorithm.

By the foregoing, a method of allocating thruster pulsewidths for the three desired torques $T_{dx}$, $T_{dy}$, and $T_{dz}$ has been disclosed. However numerous substitution and modifications may be had without departing from the spirit od the invention. For example, in the preferred embodiment shown and discussed, a spacecraft with a four thruster array is disclosed. However, it is well within the scope of the invention to provide a thruster array comprised of, for example, six thrusters with the additional two thruster being located on the north and south faces of the spacecraft and a paired torque for these additional thrusters accounted for in the same manner as discussed above.

Accordingly, the invention has been described by way of illustration rather than limitation.

What is claimed is:

1. A method of controlling the direction of a spacecraft of the type having a controller for calculating thrust forces comprising the steps of:

providing a plurality of thrusters disposed on said spacecraft in a spaced relationship relative to one another;

aligning and locating each of said plurality of thrusters at a predetermine angle on said spacecraft relative to first, second and third orthogonally oriented axes such that the firing of any given pair of thrusters produces a torque about one of said spacecraft axes; and firing of all of said plurality of said thrusters in equal amounts at one time to cause the spacecraft to move in a linear manner along one of said three orthogonally disposed axes.

2. A method of controlling the direction of a spacecraft of the type having a controller for calculating thrust forces comprising the steps of:

providing a plurality of thrusters disposed on said spacecraft in a spaced relationship relative to one another;

aligning and locating each of said plurality of thrusters at a predetermine angle on said spacecraft relative to first, second and third orthogonally oriented axes such that the firing of any given pair of thrusters produces a torque about one of said spacecraft axes;

providing said spacecraft with an attitude sensor block coupled to the controller such that the controller uses the sensor block to determine whether there is a difference between the sensed attitude and a desired or reference attitude and, if there is such a difference, calculating torques necessary to be produced by at least one of the thruster pair to minimize the difference;

assigning positive and negative torque pair values to thruster pairs corresponding to a given torque about a given one of the orthogonally oriented axes based upon a given processor duty cycle time; and calculating a dimensionless firing time for each thruster involved to effect torque about a given one of said orthogonally oriented axes by dividing the established difference by the corresponding thruster pair torque.

3. A method as defined in claim 1 further characterized by firing of all of said plurality of said thrusters in equal amounts at one time to cause the spacecraft to move in a linear manner along one of said three orthogonally disposed axes.

4. A method as defined in claim 1 further characterized by continuously summing the values of the dimensionless firing times for a given duty cycle such that for a given duty cycle a firing time for each of the thrusters is determined taking into account corrections needed relative to each said three orthogonally disposed axes.

5. A method as defined in claim 1 further characterized by checking each of the dimensionless firing time values to determine if any of said values associated with each thruster is greater than unity.

6. A method as defined in claim 5 further characterized by using the largest magnitude value associated with the dimensionless firing time for each thruster which exceeds unity to scale the remaining values.

7. A method as defined in claim 6 further characterized by calculating dimensional pulsewidths for each of the thrusters based upon a given duty cycle time.

8. A method as defined in claim 7 further characterized by calculating dimensional pulsewidths for each of the thrusters by multiplying the dimensionless firing time for each thruster by the duty cycle time to produce a product pulsewidth.

9. A method as defined in claim 8 further characterized by checking to determine whether the product pulsewidths calculated for each thruster is below a threshold pulsewidth and if a pulsewidth is below the threshold, then it is set to zero.

10. A method of controlling the direction of a spacecraft having a controller for calculating torque forces and a sensor block for sensing attitude differences relative to a point on space along three orthogonally disposed axes comprising the steps of:

providing at least four thrusters disposed on said spacecraft in a spaced relationship relative to one another;

sensing an attitude between the spacecraft and a point in space relative to three orthogonally disposed axes and determining differences between the sensed attitude and a reference attitude and, if such difference exist, calculating one or more torques necessary to be produced by at least one of the thruster pair to minimize the difference;

aligning and locating each of said plurality of thrusters at a predetermined angle on said spacecraft relative to the first, second and third orthogonally oriented axes and firing at least one predetermined pair of thrusters to produce a torque about one of said spacecraft axes in response to determined differences in attitude;

assigning positive and negative torque pair values to thruster pairs corresponding to a given torque about a given one of the orthogonally oriented axes based upon a given processor duty cycle time;

calculating a dimensionless firing time for each thruster involved to effect torque about a given one of said orthogonally oriented axes by dividing the established difference by the corresponding thruster pair torque.

11. A method as defined in claim 10 further characterized by firing of all of said plurality of said thrusters in equal amounts at one time to causes the spacecraft to move in a linear manner along one of said three orthogonally disposed axes.

12. A method as defined in claim 10 further characterized by continuously summing the values of the dimensionless firing times for a given duty cycle such that for a given duty cycle a firing time for each of the thrusters is determined taking into account corrections needed relative to each said three orthogonally disposed axes.

13. A method as defined in claim 10 further characterized by checking each of the dimensionless firing time values to determine if the value of any one of said values associated with each thruster is greater than unity.

14. A method as defined in claim 13 further characterized by using the largest magnitude value associated with the dimensionless firing time for each thruster which exceeds unity to scale the remaining values.

15. A method as defined in claim 14 further characterized by calculating dimensional pulsewidths for each of the thrusters based upon a given processor duty cycle time.

16. A method as defined in claim 15 further characterized by calculating dimensional pulsewidths for each of the thrusters by multiplying the dimensionless firing time for each thruster by the duty cycle time to produce a product pulsewidth.

17. A method as defined in claim 16 further characterized by checking to determine whether the product pulsewidths calculated for each thruster is below a threshold pulsewidth and if a pulsewidth is below the threshold by an unacceptable margin, then it is set to zero.

18. A spacecraft of the type having a block sensor means for determining attitude between the spacecraft and a point in space relative to three orthogonally disposed axes and having a controller for determining differences between the sensed attitude and a reference attitude and for calculating thrust forces based upon said determined differences, the improvement comprising:

a plurality of thrusters disposed on said spacecraft in a spaced relationship relative to one another;

said plurality of thrusters each being aligned and located on said spacecraft at a predetermine angle relative to the first, second and third orthogonally oriented axes such that the firing of any given pair of thrusters produces a torque about one of said spacecraft axes;

said controller including means for assigning positive and negative torque pair values to thruster pairs corresponding to a given torque about a given one of the orthogonally oriented axes based upon a given processor duty cycle time; and said controller including means for calculating a dimensionless firing time for each thruster involved to effect torque about a given one of said orthogonally oriented axes by dividing the established difference by the corresponding thruster pair torque.

19. A spacecraft as defined in claim 18 further characterized by said controller including means for firing of all of said plurality of said thrusters in equal amounts at one time to cause the spacecraft to move in a linear manner along one of said three orthogonally disposed axes.

20. A spacecraft as defined in claim 18 further characterized by said controller including means for assigning positive and negative torque pair values to thruster pairs corresponding to a given torque about a given one of the orthogonally oriented axes based upon a given processor duty cycle time.

21. A spacecraft as defined in claim 20 further characterized by said controller including means for calculating a dimensionless firing time for each thruster involved to effect torque about a given one of said orthogonally oriented axes by dividing the established difference by the corresponding thruster pair torque.

22. A spacecraft as defined in claim 21 further characterized by said controller including means for continuously summing the values of the dimensionless firing times for a given duty cycle such that for a given duty cycle a firing time for each of the thrusters is determined taking into account corrections needed relative to each said three orthogonally disposed axes.

23. A spacecraft as defined in claim 21 further characterized by said controller including means for checking each of the dimensionless firing time values to determine if any of said values associated with each thruster is greater than unity.

24. A spacecraft as defined in claim 23 further characterized by said controller including means for using the largest magnitude value associated with the dimensionless firing time for each thruster which exceeds unity to scale the remaining values.

25. A spacecraft as defined in claim 24 further characterized by said controller including means for calculating dimensional pulsewidths for each of the thrusters based upon a given duty cycle time.

26. A spacecraft as defined in claim 25 further characterized by said controller including means for calculating dimensional pulsewidths for each of the thrusters by multiplying each of the dimensionless firing time for each thruster by the duty cycle time to produce a product pulsewidth.

27. A spacecraft as defined in claim 26 further characterized by said controller including means for checking to determine whether the product pulsewidths calculated for each thruster is below a threshold pulsewidth and if a pulsewidth is below the threshold, then it is set to zero.

* * * * *

UNITED STATES PATENT AND TRADEMARK OFFICE
CERTIFICATE OF CORRECTION

PATENT NO. : 6,052,630
DATED : April 18, 2000
INVENTOR(S) : Thomas J. Holmes; Christopher R. Purvis It is certified that error appears in the above-indentified patent and that said Letters Patent is hereby corrected as shown below:

Col. 8, line 13, Claim 3, "1" should read --2--.
Col. 8, line 18, Claim 4, "1" should read --2--.
Col. 8, line 24, Claim 5, "1" should read --2--.

Signed and Sealed this

Tenth Day of April, 2001

Attest:

NICHOLAS P. GODICI

Attesting Officer

Acting Director of the United States Patent and Trademark Office